May 5, 1959   W. A. PLICE ET AL   2,885,622
CAPACITOR CHARGING SYSTEM

Filed May 15, 1956   2 Sheets-Sheet 1

INVENTORS
William A. Plice
Hugh S. Knowles

BY
W. E. Thibodeau, a.w. Dew & J. P. Edgerton
ATTORNEYS

INVENTORS
William A. Plice
Hugh S. Knowles

2,885,622

CAPACITOR CHARGING SYSTEM

William A. Plice, Waukegan, and Hugh S. Knowles, Glen Ellyn, Ill., assignors to the United States of America as represented by the Secretary of the Army Application May 15, 1956, Serial No. 585,125

6 Claims. (Cl. 320—1)

This invention relates to electrical generators and more particularly to miniature direct current generator units. The invention provides a light, small, spring-powered generator that uses a novel means for obtaining direct current. In a preferred embodiment, alternating current is first generated and fed into a capacitor, then the capacitor is drained each half cycle by switching means attached to the armature shaft.

An object of this invention is to generate direct current with a miniature device.

Another object is to achieve the above with a device that is sturdy, simple, and reliable, yet cheap and easy to manufacture.

The specific nature of the invention as well as other objects and advantages thereof will clearly appear from the following description and drawings in which.

Figure 1:
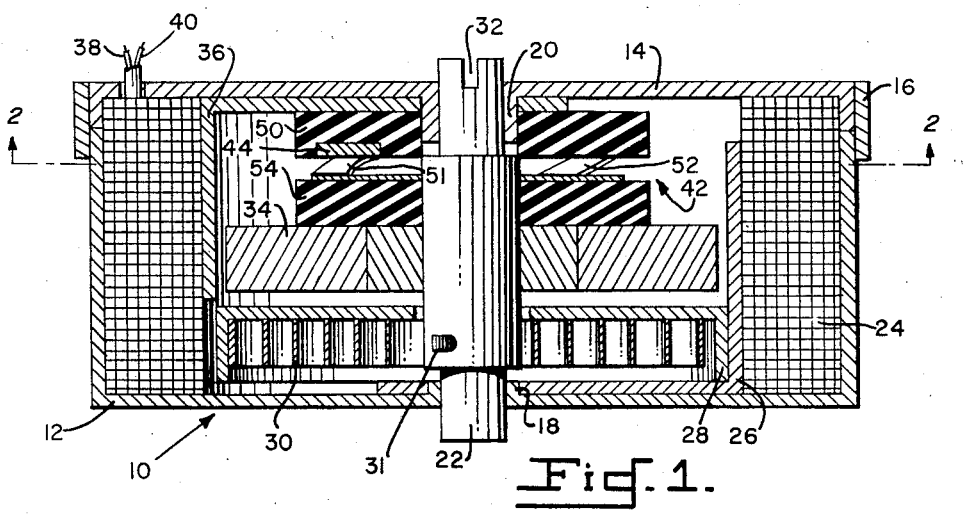
Fig. 1 is an axial section of a generator unit in accordance with the invention.

As seen in Fig. 1 of the drawing the mechanism of the generator unit 10 is enclosed in a case composed of cuplike main section 12, top section 14 and closing band 16. The case is cylindrical and at its axis has journals 18 and 20, formed by inwardly curving walls of the main and top sections 12 and 14. Shaft 22 is mounted for rotation in these journals. Along the inside perimeter of main section 12 is coil 24. Immediately within the coil is a trifurcated iron pole piece 26 which is attached to the bottom of case section 12. Within pole piece 26 and attached to it is a cup-shaped spring-holder 28 of nonmagnetic material which has one end of spiral drive spring 30 secured to it. The other end of spring 30 is attached by a catch mechanism 31 to shaft 22. As the upper end of shaft 22 has a slot 32, the spring 30 may be wound by some convenient means, which when released will cause shaft 22 to rotate. The catch 31 will engage when the spring is wound but disengage after it is unwound so that the shaft thereafter spins freely.

Magnet 34 is attached to shaft 22 above spring 30. It is a six-pole magnet in the form of a disc as is shown in the art. Depending from top section 14 is a trifurcated pole piece 36 which is similar to member 26. These two members direct the flux field of magnet 34.

It will be understood that the portion of the device as described above will produce alternating current at leads 38 and 40 coming from the coil 24.

Attached to the underside of trifurcated member 36 which is on top section 14 is a stationary part of rotary switch 42. This part consists of three arcuate conducting segments or contacts 44, 46, and 48 set in an insulating disc 50 and flush with the surface of the disc. The rotating part of switch 42 consists of interconnected spring contacts 51, 52 and 53, attached to insulating disc 54 which is attached to the shaft 22 immediately above the magnet 34.

Figure 3:
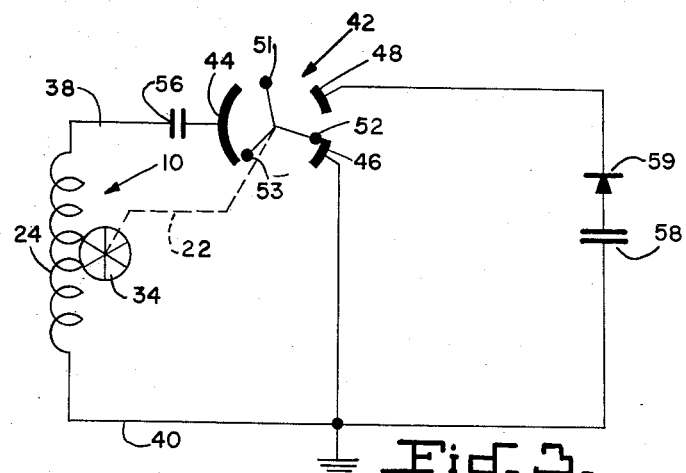
Fig. 3 is a schematic diagram of a circuit of the generator unit and associated parts.

As seen in Fig. 3, lead 38 is connected to a 0.01 microfarad capacitor 56 and lead 40 is grounded. The other side of capacitor 56 is connected to contact 44. Contact 46 is grounded. Segment 44 extends over 90° and is separated by 90° from segments 46 and 48, each of which extends over 30° with 30° between them. Spring contacts 51, 52, and 53 make point contact on disc 50 at 120° intervals. This arrangement is such that for each 120° of mechanical revolution the following sequence of switch connections are made: contact 44 to contact 46 for 30°, contact 44 unconnected for 30°, contact 44 to contact 48 for 30°, contact 44 unconnected for 30°. Contacts 46 and 48 are never connected. This 120° of mechanical revolution corresponds to 360° of the electrical cycle; therefore each of contacts 46 and 48 are connected to contact 44 for one fourth of an electrical cycle. Each of these contacts is unconnected the remainder of the electrical cycle. Contact 48 is connected to a 0.5 microfarad capacitor 58, the other side of which is grounded. Switch 42 is so timed that during the time that peak positive voltage appears at 38 contact 44 is connected to contact 48, and when peak negative voltage appears at 38 contact 44 is connected to contact 46. Thus when negative voltage appears at 38, capacitor 56 is charged and capacitor 58 is out of the circuit. When positive voltage appears at 38, a charge passes to capacitor 58, part of the charge coming from the charged capacitor 56 and part from the charge of the opposite polarity being applied to capacitor 56. The inductance of coil 24 and capacitor 56 are so adjusted as to form a tuned circuit which is related to the speed of the generator. The physical shape of the switch may be changed so that instead of having the contacts connected for 90° of each electrical half cycle they could be connected for any amount less than 150° as the design of the particular generator indicates best.

As the generator slows down due to friction, etc., the voltage at lead 38 will be less than that already developed on capacitor 58. Without capacitor 56 the charge of capacitor 58 would be lost through the coil as the speed approached zero. However, since capacitor 56 is small in relation to capacitor 58 only a portion of the voltage difference will be lost each cycle. To help prevent this loss of charge, a rectifier 59 is optionally placed in the circuit to further isolate capacitor 58.

Figure 2:
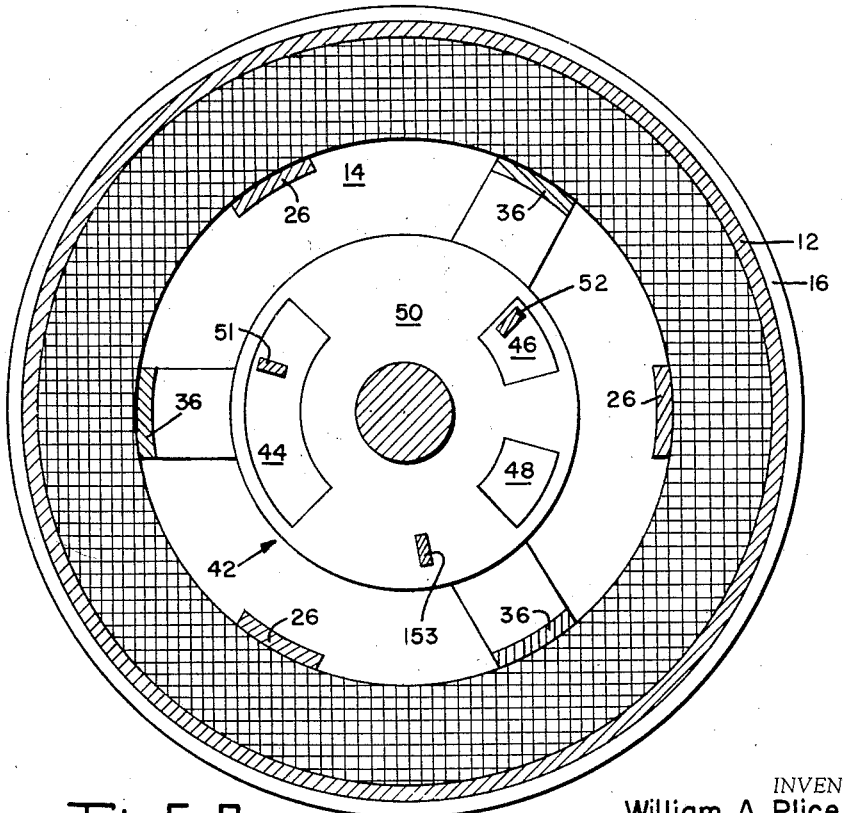
Fig. 2 is a cross section, taken on lines 2—2 of Fig. 1, showing a switch that is part of the generator unit.
Figure 4:
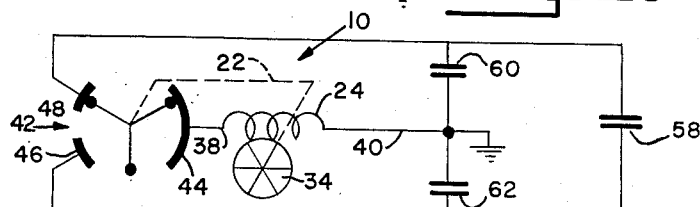
Fig. 4 is a schematic diagram of a modified circuit.

Fig. 4 shows a modification using the same generator unit shown in Figs. 1 and 2. Lead 38 from coil 24 is connected to switch segment 44. Lead 40 connects to a common point between capacitors 60 and 62 and is grounded. The other side of capacitor 60 is connected to segment 48. The other side of capacitor 62 is connected to segment 46. Capacitor 58 is connected across segments 46 and 48 as before.

Figure 5:
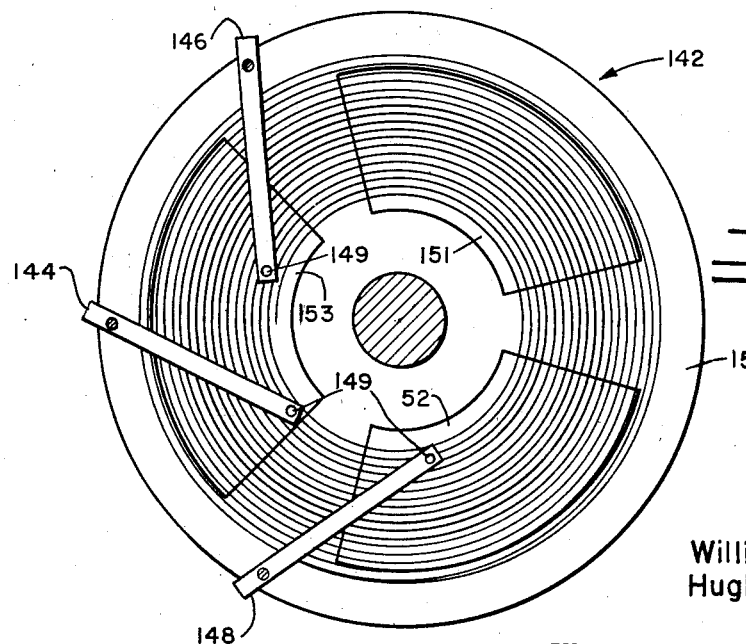
Fig. 5 is a cross sectional view of a modified switch for the generator unit.

Fig. 5 shows a modified switch 142 which may be substituted for switch 42 of the generator unit as shown in Fig. 1. Electrically it performs the exact function of switch 42 as shown in Figs. 3 and 4 except that it disconnects the capacitor 58 from the generator after it has charged and before the generator shaft runs down. It operates somewhat similar to a phonograph record and pickup. In it a rotating insulating disc 154 with a spiral groove in the flat face forming its upper surface is substituted for disc unit 54 as shown in Figs. 1 and 2. There are three symmetrical unconnected arcuate segments 151, 152, and 153 in disc 154. Each is 90° wide and separated by 30° from the adjacent one. Conducting segments 44, 46 and 48 in insulating disc 50 are replaced by three pickup arms 144, 146 and 148, each having point contact 149, pivoted to disc 50 about pivots parallel to the shaft 22. Arms 146 and 148 are arranged 60° on either side of 144. As in the previously described switch 42, for each 120° rotation, the arm 144 is unconnected for 30° rotation, connected to arm 146 for 30° rotation, unconnected for 30°, and connected to arm 148 for 30°. There are as many revolutions of the spiral on the conductive segments 151, 152, and 153 of the disc as it is desired that the shaft turn before the switch is permanently disconnected.

A variation would be to use spring contacts similar to Fig. 2, but to have them extending radially toward segments along the inner wall of a cylinder. The arms would contact the segments only if the speed were sufficient to cause the centrifugal force to overcome a spring bias.

It will be apparent that the embodiments shown are only exemplary and that various modifications can be made in construction, materials, and arrangement within the scope of the invention as defined in the appended claims.

We claim:

1. A direct-current generator unit comprising: a coil; a shaft extending through the coil; means for rotating the shaft; a magnet attached to the shaft within the coil; a switch having three contacts; a small capacitor connected between the coil and one contact; a large capacitor connected between two contacts; and means attached to the shaft for connecting each of said large capacitor contacts to the remaining contact not more than 150° of an electrical cycle; the mass of said shaft and elements connected to it, the power of said means for rotating the shaft, and the size of said small capacitor and coil being such that said small capacitor and coil form a tuned circuit, the frequency of which is related to the speed at which the shaft will rotate.

2. A direct-current generator unit comprising: a coil; a shaft extending through the coil; means for rotating the shaft; a magnet attached to the shaft within the coil; a switch having three contacts; a small capacitor connected between the coil and one contact; a large capacitor connected between two contacts, said small and large capacitors being connected to a common switch contact; a second small capacitor connected between a point common to said first-mentioned small capacitor and coil and a point common to said large capacitor and the other switch contact of said large capacitor, the coil being connected to said remaining contact; and means attached to the shaft for connecting each of said large capacitor contacts to the remaining contact not more than 150° of an electrical cycle.

3. A direct-current generator unit comprising: a coil; a shaft extending through the coil; means for rotating the shaft; a magnet attached to the shaft within the coil; a switch having three contacts; a large capacitor connected between two contacts; a small capacitor connected between the coil and the remaining contact; and means attached to the shaft for connecting each of said large capacitor contacts to said remaining contact not more than 150° of an electrical cycle.

4. A direct-current generator unit comprising: a coil; a shaft extending through the coil; means for rotating the shaft; a magnet attached to the shaft within the coil; a switch having three contacts, said three contacts being arcuate conducting segments set in a disc of insulating material attached to said coil; a small capacitor connected between the coil and one contact; a large capacitor connected between two contacts; and means attached to the shaft for connecting each of said large capacitor contacts to the remaining contact not more than 150° of an electrical cycle, said means for connecting including three interconnected spring contacts attached to the shaft.

5. A direct-current generator unit comprising: a coil; a shaft extending through the coil; means for rotating the shaft; a magnet attached to the shaft within the coil; a switch having three contacts, said three contacts being point contacts attached to said coil; a small capacitor connected between the coil and one contact; a large capacitor connected between two contacts; and means attached to the shaft for connecting each of said large capacitor contacts to the remaining contact not more than 150° of an electrical cycle, said means for connecting including three arcuate conducting segments set in a disc of insulating material attached to said shaft.

6. The invention as defined in claim 5, wherein said three contacts are pivoted about axes parallel to said shaft, and said disc has a spiral groove in its flat face with said contacts in said groove.

References Cited in the file of this patent

UNITED STATES PATENTS 2,609,411   Reijmst _____ Sept. 2, 1952

FOREIGN PATENTS 480,072   Great Britain _____ Feb. 16, 1938